United States Patent
Pfeiffer et al.

(10) Patent No.: US 11,630,611 B2
(45) Date of Patent: Apr. 18, 2023

(54) METHOD OF PROCESSING PRINT JOBS WITH AN UNUSABLE PRINTS PREDICTION

(71) Applicant: Heidelberger Druckmaschinen AG, Heidelberg (DE)

(72) Inventors: Nikolaus Pfeiffer, Heidelberg (DE); Steffen Neeb, Bensheim (DE); Franz Woellert, Heidelberg (DE); Roland Stenzel, Heidelberg (DE); Nicolas Martin, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 17/207,970

(22) Filed: Mar. 22, 2021

(65) Prior Publication Data

US 2021/0294540 A1    Sep. 23, 2021

(30) Foreign Application Priority Data

Mar. 20, 2020   (DE) ............... 10 2020 107 707.6

(51) Int. Cl.
*G06F 3/12*     (2006.01)
*G06K 15/02*    (2006.01)

(52) U.S. Cl.
CPC .......... *G06F 3/1205* (2013.01); *G06F 3/1257* (2013.01); *G06F 3/1275* (2013.01); *G06K 15/1809* (2013.01); *G06K 15/1856* (2013.01)

(58) Field of Classification Search
CPC .... G06F 3/1205; G06F 3/1257; G06F 3/1275; G06K 15/1856; G06K 15/1809
See application file for complete search history.

(56) References Cited

U.S. PATENT DOCUMENTS

| | | | |
|---|---|---|---|
| 8,333,150 B2 | 12/2012 | Schaedlich et al. | |
| 11,048,455 B1 * | 6/2021 | Armstrong | G06N 20/00 |
| 2015/0103364 A1 * | 4/2015 | Abe | H04N 1/00411 358/1.13 |
| 2015/0131116 A1 * | 5/2015 | Sochi | H04N 1/00045 358/1.14 |
| 2016/0039234 A1 * | 2/2016 | Hirai | G03G 15/50 347/5 |
| 2018/0267748 A1 * | 9/2018 | Takizawa | G06F 3/1207 |
| 2019/0073164 A1 * | 3/2019 | Yamasaki | G06F 3/1234 |

FOREIGN PATENT DOCUMENTS

| | | |
|---|---|---|
| DE | 4439961 A1 | 7/1995 |
| DE | 102008034943 A1 | 1/2010 |
| DE | 102018220970 A1 | 6/2020 |

\* cited by examiner

*Primary Examiner* — Huo Long Chen
(74) *Attorney, Agent, or Firm* — Laurence A. Greenberg; Werner H. Stemer; Ralph E. Locher

(57) ABSTRACT

A method of processing print jobs on a printing substrate processing machine by using a computer, includes creating a data model for the computer with parameters for an unusable print/set-up time prediction on the basis of global print jobs and printing machine data, training the data model on the basis of global and/or local print jobs and printing machine data by using the computer, and defining ease-of-use criteria by an operator. The trained data model for the computer is used to predict the number of unusable prints during set up and set-up time of the printing substrate processing machine. The order of the processing of the print jobs is optimized on the basis of the predicted number of unusable prints during set-up and the predicted set-up time by using the computer.

7 Claims, 3 Drawing Sheets

METHOD OF PROCESSING PRINT JOBS WITH AN UNUSABLE PRINTS PREDICTION

CROSS-REFERENCE TO RELATED APPLICATION

This application claims the priority, under 35 U.S.C. § 119, of German Patent Application DE 10 2020 107 707.6, filed Mar. 20, 2020; the prior application is herewith incorporated by reference in its entirety.

BACKGROUND OF THE INVENTION

Field of the Invention

The present invention relates to a method of optimizing the processing of print jobs by computer-assisted analysis of global machine parameters in a machine for processing printing substrates.

The technical field of the invention is the field of print shop logistics.

Various best-practice approaches have become known in the field of processing print jobs on printing machines. Those approaches provide ways of determining an expedient order in which print jobs are to be processed under certain aspects. In general, the number of unusable prints depends on the condition of the printing machine at the beginning of a print job—at least in the border range of the lowest possible number of unusable prints. That means that the decision on whether to carry out washing programs and which washing programs to carry out when print jobs change is very important. If no washing program is carried out, there is direct dependence on the previous print job because the previous job determines which inks are present in the entire inking unit of the machine. At present, the number of unusable prints a job necessitates is estimated by a human operator. There is no valid calculation model for calculating the number of unusable prints.

A prior art method known in this context is a method of operating a machine for processing printing substrates by using a computer, the method including the steps of obtaining print job parameters of print jobs for the machine for processing printing substrates and machine parameters by using the computer, analyzing the obtained parameters to determine the state of the machine by using the computer, requesting and providing fluid consumables to optimize the operation of the machine on the basis of the determined state of the machine by using the computer and carrying out maintenance measures, optimizing maintenance measures on the basis of the determined state of the machine, and carrying out the optimized maintenance measures by using the computer. However, the method focuses on the calculation of consumables. It does not provide a way of calculating the number of unusable prints that may potentially occur.

Since the number of unusable prints of a job basically is an unknown quantity, no prediction on the number of unusable prints and the corresponding set-up times is possible without further auxiliary measures.

That has negative consequences, including the facts that:
- no job-related pre-calculation/no pre-calculation related to the processing order of the jobs is done,
- the print processing order is not optimized to minimize unusable prints, and
- no optimization in terms of unusable prints/time is possible for instance to decide at what time a correspondingly expensive substrate is printed.

BRIEF SUMMARY OF THE INVENTION

It is accordingly an object of the invention to provide a method of processing print jobs with an unusable prints prediction, which overcomes the hereinafore-mentioned disadvantages of the heretofore-known methods of this general type and which provides an optimized way of processing print jobs on a machine for processing printing substrates in a print shop, in particular a way which is optimized in terms of reducing the number of unusable prints.

With the foregoing and other objects in view there is provided, in accordance with the invention, a method of processing print jobs on a machine for processing printing substrates by using a computer, the method comprising the steps of creating a data model for the computer with parameters for an unusable print/set-up time prediction on the basis of global print jobs and printing machine data, training the data model on the basis of global and/or local print jobs and printing machine data by using the computer, an operator defining ease-of-use criteria, the computer using the trained data model to predict the number of unusable prints during set up and the set-up time of the machine for processing printing substrates, and optimizing the order of the processing of the print jobs on the basis of the predicted number of unusable prints during set-up and the predicted set-up time by using the computer.

The method of the invention is divided into two main stages. The first stage is to create and, above all, train a data model as an unusable prints predictor. For this purpose, all available data on print jobs and the machine for processing printing substrates are input. This refers to the available data about the machine which is to process the current print jobs, about further machinery in the same print shop as well as about machinery in potential further print shops. Thus the most frequent case is that the data model is created and on the basis of global print job and machine data and taught in and is then further adapted on the basis of local job and machine data at the machine that is present at the location. The second stage of the method of the invention is to apply the trained data model to make the most accurate possible prediction on the number of unusable prints created during set-up and of the set-up time of the machine for processing printing substrates. The computer may then use this prediction to optimize the processing order of the print jobs.

Advantageous and thus preferred further developments of the method of the invention will become apparent from the associated dependent claims and from the description with the associated drawings.

Another preferred development of the method of the invention in this context is that the number of unusable prints is a function of a print-job related target quality value, which an operator may individually input for every print job. This value defines the point from which a printing substrate that has been created and imaged is no longer unusable. This target value is thus important for the result of the data model's calculation of the number of unusable prints created during set-up. The way in which the quality target value is input is of minor importance. For instance, it could be a maximum acceptable tolerance for a target color value or the target value itself. The only important issue is that it needs to be clear as to when a printed product that has been created is no longer unusable but a completed printed product and vice versa.

A further preferred development of the method of the invention in this context is that the ease-of-use criteria include data on color changes and/or printing substrate changes of the machine for processing printing substrates.

These are merely examples of ease-of-use criteria; all user-centered data relevant to a prediction of the number of unusable prints created during set-up and set-up time may be subsumed under this term.

An added preferred development of the method of the invention in this context is that the parameters of the data model include the resultant coloration, the color target values, the printing substrates that are used, and the type of machine that is used. The aforementioned number of unusable prints created during set-up, which, as mentioned above, is dependent on the target quality value which defines the point from which a printed substrate is no longer unusable, in particular relies on the coloration that has been attained and target color values as well as on the printing substrates that are used and the corresponding machine type. In particular the coloration that has been attained in comparison with the respective color value determines whether a print is unusable. These parameters have an immediate influence on the point in time when the target quality value is attained and consequently on set-up times and the number of unusable prints created during set-up.

An additional preferred development of the method of the invention in this context is that upon a print job change, to train the data model, a prediction on the number of unusable prints created during set-up and the required set-up time of the printing machine is made by the untrained data model, a printing operation of the current print job is subsequently carried out, data on the parameters of the data model are collected, a comparison of the values of the attained number of unusable prints created during set-up as well as the required set-up time with the predicted values is made, and the data model is optimized using the results of the comparison and the collected data on the characteristic values. This corresponds to the preferred approach to training the data model. Nevertheless, further approaches are conceivable as long as they result in a trained data model capable of making the most accurate possible prediction on the number of unusable prints created during set-up and the required set-up time.

Another preferred development of the method of the invention in this context is that the approach to training the data model is also used for the continuous adaptation of the data model during the operation of the machine for processing printing substrates. In this case, the training of the data model is already done at the corresponding manufacturer's location where the respective workflow system that is used at the print shop is created. This means that a data model that has been trained in a sufficiently accurate way should already be available. In addition, it is nevertheless likewise possible to have a suitable computer continue to record the data that is newly created while the respective machine is in operation, analyze them, and continuously train the data model. Especially the local machine data are very useful for making the most accurate possible prediction of the required set-up time and the number of unusable prints. However, if global data, i.e. data of other machinery, continue to be available, they may likewise be used for a continuous improvement of the data model.

A concomitant preferred development of the method of the invention in this context is that to optimize the order in which print jobs are processed, the computer adapts an existing job list of print jobs, factoring in the predicted number of unusable prints created during set-up and the predicted set-up time of the printing machine as well as the predefined ease-of-use criteria in view of minimizing the number of unusable prints created during set-up and the set-up time in terms of the order of print jobs. This means that based on the set-up time and number of unusable prints created during set-up as predicted by the trained data model, a user aided by the computer or the computer itself may realize that the order of processing existing print jobs as currently planned is not ideal in terms of minimizing set-up times and the number of unusable prints. This means that the order may be optimized in a corresponding way and the data model may recalculate the set-up time and the number of unusable prints to see whether a corresponding improvement is attained. Based on the predictions on set-up time and number of unusable prints, a systematic approach may thus result in a significant optimization of the processing of the pending print jobs.

Other features which are considered as characteristic for the invention are set forth in the appended claims. The invention as well as further developments of the invention that are advantageous in constructional and/or functional terms will be explained in more detail below with reference to the associated drawings and based on at least one exemplary embodiment.

Although the invention is illustrated and described herein as embodied in a method of processing print jobs with an unusable prints prediction, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
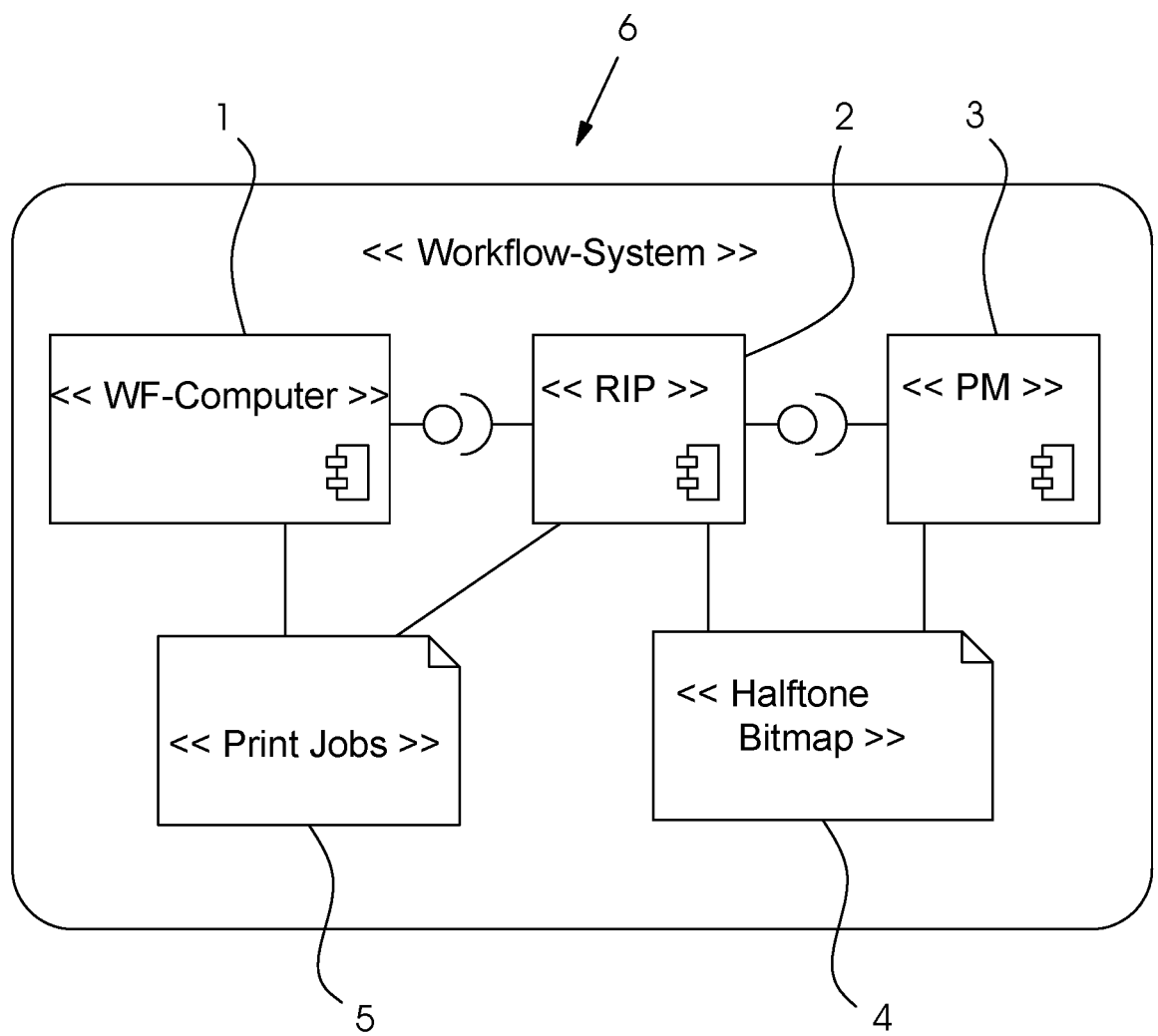
FIG. 1 is a workflow system set up in accordance with the invention for use in a print shop.

Referring now in detail to the figures of the drawings, in which mutually corresponding elements have the same reference symbols, and first, particularly, to FIG. 1 thereof, it is seen that the method of the invention is used on a printing machine 3 that is included in a specific workflow system 6. An example of such a workflow system 6 is shown in FIG. 1. The workflow system 6 runs on one or more computers 1 for processing the corresponding print jobs 5. A raster image processor 2 creates bitmaps of a print job 5 to be printed on the printing machine 3. The bitmaps 4 are then forwarded to the printing machine 3 for a corresponding production print run.

The object of the method of the invention is to automatically provide a prediction on the number of unusable prints and on the required set-up times for all print jobs 5, which are usually organized in the form of a job list 10a, in a print shop, and to use the data to optimize the order of the print jobs 5 to be processed in an adapted job list 10b.

The desired outcome is a process that runs in a fully automated way on the basis of all available customer data.

In addition, all relevant parameters that have an influence on the printing machines 3 are recorded and forwarded to a data model 8 for analysis. These parameters include, for instance,
coloration
target values
substrates
printing machine type
etc.

In addition, a statistical analysis is made to factor in outliers in the data.

Another aspect is the use of the data model which uses corresponding ease-of-use parameters 11. Thus the assessment of the operator is factored in and a further optimization of the processes on the basis of the data model 8 and the ease-of-use parameters 11 used in a corresponding way is provided.

The prior art so far merely relies on a manual knowledge-based optimization of the print jobs 5. However, this requires an experienced operator. In addition, it leads to neglecting the current job structure, prevents an adaptation to new processes, and is prone to operating errors.

The preferred embodiment of the method of the invention includes of the following steps:
1. Create a data model 8 for predicting the number of unusable prints and the required set-up time on the basis of worldwide customer data.
2. Train the computer-assisted program of an optimizer 12 on the basis of current customer data and using the data model 8.
3. Optimize and continuously adapt the optimizer 12/the data model 8 while they are in use.
4. Use the data model 8 to predict the number of unusable prints and the required set-up time.
5. Use the data model 8 to optimize pre-calculation.
6. Provide ease-of-use parameters 11 such as color change, substrate change, etc.
7. Use the optimizer 12 to optimize the processing order.

Figure 2:
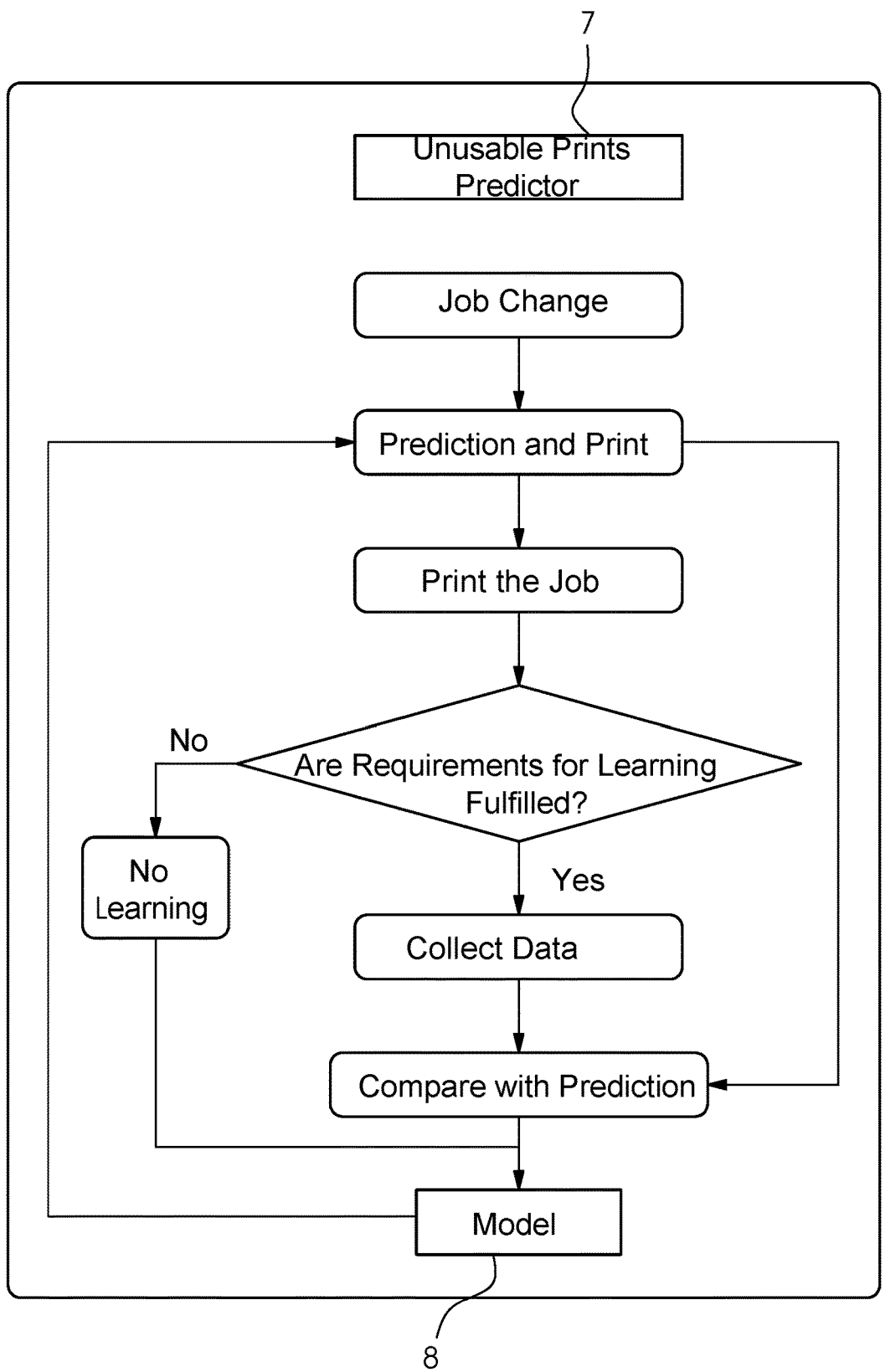
FIG. 2 is a flow chart of the creation and training of the unusable prints prediction data model.

FIG. 2 is a schematic flow chart of the first three steps for this system of an unusable prints predictor 7. Further features of the method include a statistical analysis to find outliers. These may include: good-sheet counter forgotten, number of unusable prints greater than a specified number of print sheets, more than x stops during set-up, good-sheet counter and neutral unusable prints do not correlate, etc.

Even a fully automated set-up without any manual intervention or with only few manual interventions in the form of unchanged target values after the beginning of production printing or of requiring PPI data to be available is an important aspect for the method. Another important aspect is to check whether a good-sheet counter was used.

Moreover, a comparison with the prediction provides feedback on whether the optimizer 1 and the data model 8 correlate, i.e. it gives the operator an indication of a potential inaccuracy of the model that needs to be remedied.

So-called big data methods are used to create the data model 8 which has not existed so far. The data model 8 is based on many classes of parameters; i.e. there are job parameters, machine parameters, customer parameters, substrate parameters, color parameters, etc. Some of the parameters may refer to the previous print job 5 to document the state of the respective printing unit at the beginning of the print job.

Moreover, the data model 8 is configured for the number of unusable prints to be dependent on a target quality value, in particular the coloration deviation dF, which may individually be input by the job planner or machine operator for every print job.

Using the data model 8 that has been created and trained in this way, the optimizer 12 may predict the required number of unusable prints created during set-up and the required set-up time for every print job 5 in the print shop in accordance with the respective target quality. Consequently, this provides an improved print job calculation for customers. For the computer 1 in question or, if desired, an operator may use the calculated number of unusable prints created during set-up and the required set-up time to optimize the order of jobs in the adapted job list 10b on the basis of weighted parameters for number of unusable prints, set-up time, ease of use (user-related), i.e. an allocation for every job is possible. In particular, an optimization of the order of jobs in terms of minimizing the number of unusable prints may be specified. In addition, washing operations may be planned in accordance with these aspects; this in turn has an influence on the planning of jobs.

Figure 3:
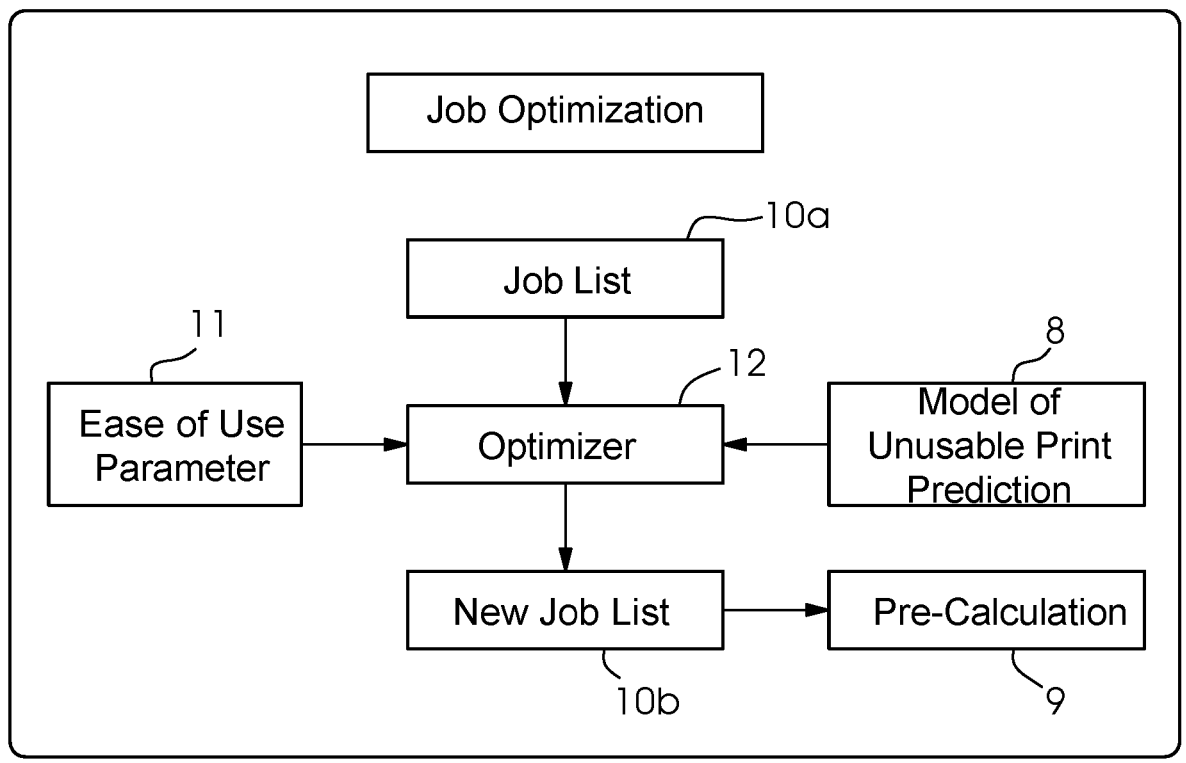
FIG. 3 is a block diagram representing the interdependencies of the job optimization with the aid of the unusable pint prediction data model.

FIG. 3 illustrates the interdependencies between the various components which contributed to the optimization of the order of jobs in accordance with the method of the invention. In addition to the data model 8 that has been created, these above all include the optimizer 12, which is an instance in the program running on the computer 1 and which uses the data model 8 in a corresponding way. In this process, it uses the ease-of-use parameters 11 to adapt the existing job list 10a by using the data model 8. The new job list 10b which has been created in this way may then be used in a corresponding way in the pre-calculation for operating the printing machine(s) 3.

It is important to note that the models are not fixed but self-learning systems based on customer/machine data. For this purpose, it is only possible to a limited extent because much data with complex interdependencies is required. On the long run, such data cannot be contained in a fixed data structure.

Thus the preferred embodiment with its flexible, trained data model:
1. Is more accurate because the amount of influencing parameters is very large and any modeling without a big data approach will only be useful to a limited extent; characteristics of the machine, customer, color, printing substrates are factored in;
2. Is more flexible because in principle, new data and even parameters may be added at any time to further improve the data model 8;
3. Provides modeling which no longer requires detailed knowledge;
4. Permits an automated adaptation to unknown systems and print job processes.

This results in the following advantages:
Even less qualified operators obtain an optimum order of print jobs.
No manual intervention is required.
Faulty operator actions are prevented.
Costs are saved as a result of the optimization of the order of print jobs because there are fewer unusable prints/ shorter set-up times.
A much better calculation of costs is possible.

The following is a summary list of reference numerals and the corresponding structure used in the above description of the invention:
1 computer
2 raster image processor (RIP)
3 printing machine
4 halftone image
5 print job
6 workflow system 7 system unusable prints predictor
8 data model
9 pre-calculation
10a job list with print jobs
10b new, adapted job list
11 ease-of-use parameters
12 optimizer

The invention claimed is:

1. A method of processing print jobs on a printing substrate processing machine, the method comprising:
creating a data model for a computer with parameters for an unusable print or set-up time prediction based on a global print job and printing machine data;
training the data model based on at least one of a global or local print job and printing machine data by using the computer;
creating an operator defining ease-of-use criteria provided by an operator;
using the computer to utilize the trained data model to predict a number of unusable prints during set up and a set-up time of the printing substrate processing machine;
determining the number of unusable prints as a function of a print-job related target quality value, which an operator may individually input for every print job;
optimizing an order of the processing of the print jobs based on the predicted number of unusable prints during set-up and the predicted set-up time by using the computer; and
printing a number of unusable prints at a beginning of a print job based on a condition of the printing substrate processing machine.

2. The method according to claim 1, which further comprises including in the ease-of-use criteria: data regarding at least one of color or printing substrate changes of the printing substrate processing machine.

3. The method according to claim 1, which further comprises including in the parameters of the data model: an attained coloration, color target values, printing substrates being used, and machine type being used.

4. The method according to claim 1, which further comprises upon a print job change, training the data model by:
using the untrained data model to predict the number of unusable prints created during set-up and the required set-up time of the printing machine;
subsequently carrying out a printing operation of a current print job;
collecting data regarding the parameters of the data model;
carrying out a comparison of values of the attained number of unusable prints created during set-up as well as the required set-up time with predicted values; and
optimizing the data model by using results of the comparison and the collected data regarding characteristic values.

5. The method according to claim 4, which further comprises using steps to train the data model for a continuous adaptation of the data model during operation of the printing substrate processing machine.

6. The method according to claim 1, which further comprises carrying out the optimizing of the order of the processing of print jobs by using the computer to adapt an existing job list of print jobs, factoring in the predicted number of unusable prints created during set-up and the predicted set-up time of the printing machine as well as the predefined ease-of-use criteria in order to minimize the number of unusable prints created during set-up and the set-up time in terms of the order of print jobs.

7. A method of processing print jobs on a printing machine having printing units, the method comprising:
creating a data model for a computer with parameters for an unusable print or set-up time prediction based on a global print job and printing machine data;
training the data model based on at least one of a global or local print job and printing machine data by using the computer;
creating an operator defining ease-of-use criteria provided by an operator;
using the computer to utilize the trained data model to predict a number of unusable prints during set up and a set-up time of the printing machine;
determining the number of unusable prints as a function of a print-job related target quality value, which an operator may individually input for every print job;
optimizing an order of the processing of the print jobs based on the predicted number of unusable prints during set-up and the predicted set-up time by using the computer; and
printing a number of unusable prints at a beginning of a print job based on a condition of the printing machine having printing units.

* * * * *